March 23, 1965　　　J. H. BOUNDY　　　3,174,330
CENTER OF GRAVITY APPARATUS
Filed Jan. 17, 1962　　　2 Sheets-Sheet 1
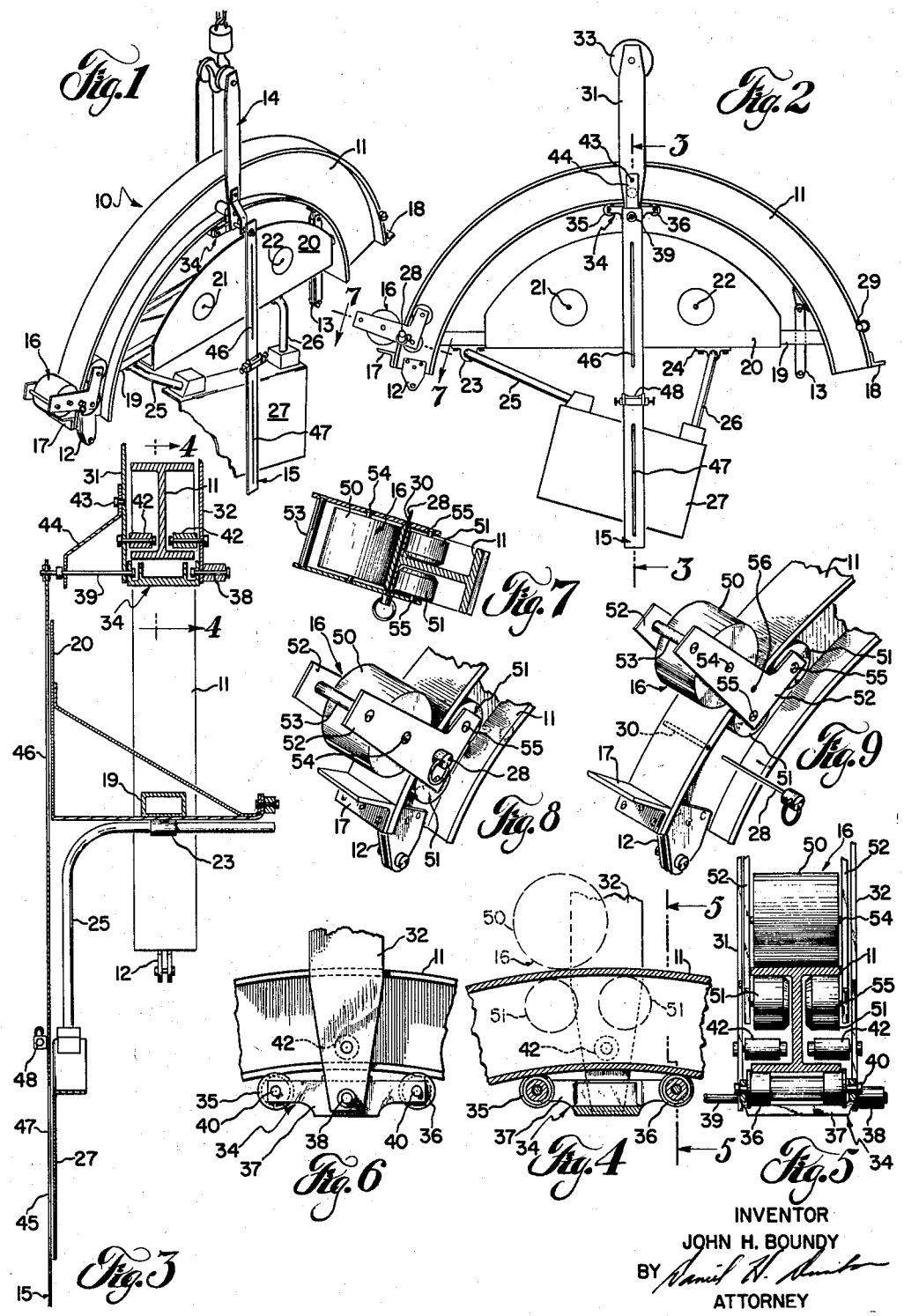
INVENTOR
JOHN H. BOUNDY
BY
ATTORNEY March 23, 1965  J. H. BOUNDY  3,174,330
CENTER OF GRAVITY APPARATUS
Filed Jan. 17, 1962  2 Sheets-Sheet 2
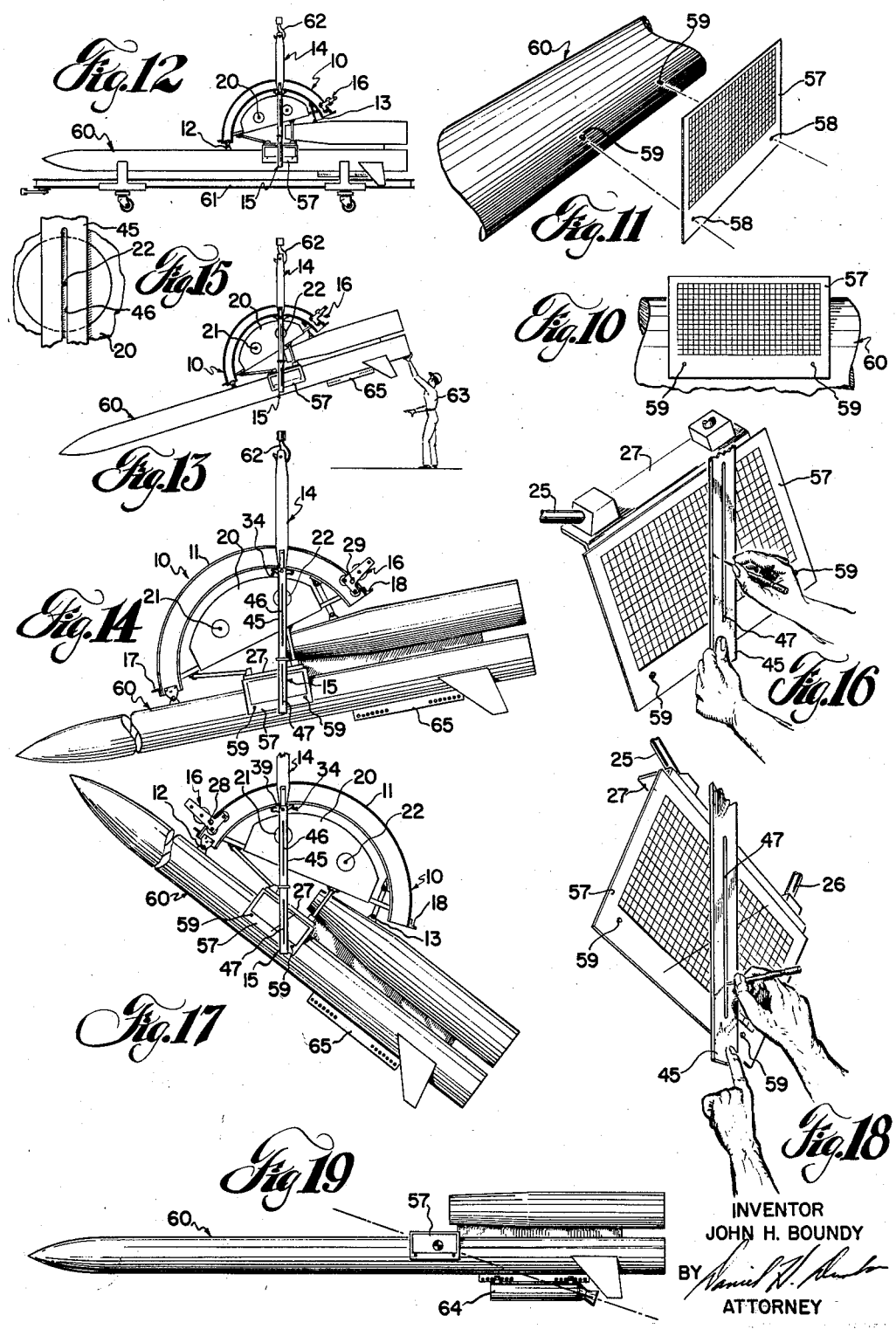
INVENTOR
JOHN H. BOUNDY
BY
ATTORNEY United States Patent Office 3,174,330
Patented Mar. 23, 1965

3,174,330
CENTER OF GRAVITY APPARATUS
John Harold Boundy, Reynoldsburg, Ohio, assignor to North American Aviation, Inc.
Filed Jan. 17, 1962, Ser. No. 166,897
4 Claims. (Cl. 73—65)

This invention concerns apparatus for graphically locating the center of gravity of an object suspended therefrom.

An important object of my invention is to provide apparatus which may be used to accurately graphically locate the center of gravity of a suspended object such as a missile or the like with a minimum of required effort.

Another object of this invention is to provide apparatus which may be utilized to locate the center of gravity of an object such as a missile or the like in a manner which requires only one operation of attaching the object to the apparatus.

Another object of my invention is to provide apparatus which may be utilized to locate the center of gravity of a missile or the like in a manner which avoids the unwanted introduction of extraneous forces and effects otherwise associated with the apparatus.

Other objects and advantages of this invention will become apparent during consideration of the description and drawings.

In the drawings:

FIG. 1 is a perspective view of apparatus incorporating the features of my invention;

FIG. 2 is a front elevational view of the apparatus shown in FIG. 1;

FIG. 3 is a sectional view taken at line 3—3 of FIG. 2;

FIGS. 4 through 6 illustrate details of a support assembly incorporated in the apparatus of FIGS. 1 through 3;

FIGS. 7 through 9 illustrate details of a movable weight assembly incorporated in the apparatus of FIGS. 1 through 3;

FIGS. 10 and 11 illustrate a reference card and a method of locating the reference card with respect to an object whose center of gravity is to be graphically located;

FIG. 12 illustrates a missile combined with the apparatus of this invention;

FIGS. 13 through 18 illustrate details and steps typically employed with my invention to precisely graphically locate a missile center of gravity; and FIG. 19 illustrates a completely assembled missile.

Apparatus incorporating the features of my invention is referenced generally by the numeral 10 in FIG. 1 and is comprised of a curved beam assembly 11, connector devices 12 and 13 for suspending an object such as a missile or the like therefrom, a support assembly 14, and a pendulum assembly 15. Apparatus 10 is particularly useful for precisely graphically locating the center of gravity of objects which are symmetrical about a reference (vertical) plane and can have application to objects other than missiles.

Curved beam 11 has an I-shaped cross-section and has a design center of curvature which is preferably located in the region of the design center of gravity of the to-be-analyzed object that will be suspended therefrom. Curved beam assembly 11 incorporates a movable weight assembly designated 16 and attached end stops 17 and 18 to limit movement of the weight assembly. A cross-bar 19 attached at either extreme to curved beam 11 carries the reference plate designated 20. This plate provides a surface upon which center of gravity locations 21 and 22 are scribed or otherwise marked. Connectors 23 and 24 are secured to the cross-bar 19 and reference plate 20 combination and carry mounted arms 25 and 26. It should be noted that plate 27 is provided as a backup for a reference card which is subsequently marked when using apparatus 10 to graphically determine the center of gravity of the object suspended from the apparatus. Weight assembly 16 may be located at the position shown in FIG. 2 by the removable pin designated 28 or may be moved to a position such as that shown in FIGS. 12 through 14 and properly located with respect to beam 11 by the pin designated 29. Pins 28 and 29 each cooperate with a hole 30 (FIG. 9) in the upper flanges of the beam. When weight assembly 16 is in the FIG. 2 position, the center of gravity of the curved beam 11, connectors 12, 13, and weight assembly 16 combination is at the location designated 21. When weight assembly 16 is located in position by pin 29 the center of gravity of the curved beam 11, connectors 12, 13, and weight assembly 16 combination is at the position designated 22.

Connectors 12 and 13 are arranged to cooperate with connecting devices provided on the object to be suspended from the tool. Any suitable form of coupling may be employed. However, I prefer that one of the connector devices, e.g., component 13, be pivotally connected to curved beam 11 to facilitate making any adjustment that might be required to attach the object to the connectors.

Support assembly 14 includes side straps 31 and 32, grooved cross member 33, and car assembly designated 34. Component 33 is provided for attaching apparatus 10 to the hook of a spring balance or other support and connects strap members 31 and 32 at their upper extremes. Car assembly 34 includes opposed rollers 35 and 36 that engage the lower flanges of curved beam 11. The frame 37 of the car assembly 34 is pivotally connected to side straps 31 and 32 by the pivots designated 38 and 39. Rollers 35 and 36 are connected to frame 37 by the shafts or bearing referenced as 40. An idler roller 42 may be provided as a safety feature, if desired; it should be located so as to not interfere with normal movement of beam 11 on rollers 35 and 36. Also, pivots 38 and 39 should be designed so as to provide a minimum of frictional resistance to rotation of car assembly 34 and all components carried thereby relative to strap members 31 and 32. The center of gravity of car assembly 34 preferably lies on a line coincident with the axes of pins 38 and 39.

Pendulum assembly 15 is carried by support assembly 14 and freely rotates relative thereto. The connection between pendulum member 45 and strap member 31 is accomplished through use of an extended length of pivot pin 39. One end region of pin 39 is supported by member 31 (and to car assembly 34) and the other end region is supported by a bracket 44 connected to the strap member by fastener 43. Member 45 is provided with the narrow elongated slots 46 and 47 shown in FIGS. 1 and 2. Slots 46 and 47 are aligned with each other and their projection intersects the axis of pin 39 and the axis of pivot 38; more specifically, their scribing or reference edges are on a line which extends normal to the axis of pin 38 and through the center of gravity of member 45. A bubble level 48 may be secured to elongated member 45 for use in checking its alignment with true vertical when freely pivoted about pin 39. Pendulum 45 is positioned slightly forward of reference plate 20 and backup plate 27.

FIGS. 7 through 9 provide details regarding weight assembly 16. Such assembly includes upper roller 50 and lower rollers 51. Such rollers are located at each side of the upper flanges and web of curved beam 11. The rollers are held in position by L-shaped plate members 52 and the fasteners cooperating therewith. Pin 53 connects the plate members at their upper extreme. Pin 54 connects the plate members together at a lower region and also serves as the rotational bearing for roller 50. Stud members 55 are employed to rotationally carry rollers 51 and to secure those rollers relative to side plates 52. Holes 56 are provided in plate members 52 for use in locating weight assembly 16 in a correct position by use of either pin 28 or pin 29.

As indicated above, the apparatus of this invention may be used to accurately graphically locate the center of gravity of a suspended object. In doing so it is preferred that the graphical presentation of center of gravity information be developed using a reference card such as the component 57 shown in FIGS. 10 and 11. Reference card 57 typically includes coordinate lines which have a predetermined position with respect to reference points on the suspended object. As shown in FIGS. 10 and 11, card 57 may be specifically located relative to the object by means of the holes 58 which cooperate with pins 59. Pins 59 in turn are provided at a predetermined position with respect to a reference location on the suspended object.

The apparatus of my invention may be described in terms of its application to the determination of the location of the center of gravity of a target training missile 60. In the described application the center of gravity of missile 60 must be precisely located in order that a subsequently added booster propulsion unit might be properly positioned on the missile. It is normally preferred that the line of thrust of the booster unit pass through the center of gravity of the complete missile assembly.

Because of size and weight characteristics it is common to transport to-be-analyzed objects such as missile 60 to apparatus 10 using a truck device such as that designated by the reference numeral 61 in FIG. 12. Also, apparatus 10 is typically suspended from the hook 62 of a spring balance (not shown) or the like. The balance is employed to make a weight determination at the time of center of gravity analysis. Conventional mounting lugs on misisle 60 are engaged with the connectors 12 and 13 of apparatus 10. As shown in FIG. 12, weight assembly 16 may be initially located in proper position by the pin 29 near the right extreme of curved beam 11. If desired, the center of gravity analysis made with apparatus 10 may be accomplished with an initial operation wherein weight assembly 16 is located in position by the pin 29 near the left extreme of curved beam 11.

As shown in FIG. 13, the apparatus-object combination is hoisted as by hook 62 to a position where curved beam 11 and attached missile 60 may be rotated relative to portions of support assembly 14 and without restriction as by contact with the floor or near-by structures and equipment. A reference card 57 is mounted in proper location with respect to the suspended object and in a position just forward of the backup plate designated 27. In the FIG. 13 position, the curved beam 11 and missile 60 attached thereto has been rotated manually by the operator 63 to a position wherein the center of gravity location 22 scribed on reference plate 20 is aligned with slot 46 of pendulum member 45. As previously indicated, pendulum 45 freely rotates about pivot pin 39 so that slots 46 and 47 are oriented in a true vertical condition. In attaining the FIG. 13 position, which position is shown in greater detail in FIG. 14, the curved beam and missile combination as supported by car assembly 34 also freely rotates about aligned pivot pins 38 and 39. Accordingly, the center of gravity of the apparatus-object combination rotates to a true minimum position which is along a vertical line that is parallel to slot 47 of pendulum member 45. In this condition the gravity or weight forces associated with apparatus 10 are co-linear with the similar forces acting on missile 60. It is then necessary only to scribe a line on chart 57 in the manner illustrated in FIG. 16 to accurately locate the edge of a true vertical and normal plane which contains the missile center of gravity. To complete the analysis of the center of gravity location of missile 60 one additional determination is required to be made and such can be accomplished without detaching the suspended object from apparatus 10.

To accomplish the additional determination, weight assembly 16 is moved from its position adjacent the right extreme of curved beam 11 to its pre-selected position adjacent the left extreme of curved beam 11 and secured in place relative to beam 11 by removable pin 28. The curved beam and missile combination is next readily manually rotated from the position shown in FIG. 14 to the position shown in FIG. 17. The apparatus-missile combination then is in a condition where center of gravity location 21 on plate 20 is aligned with slot 46 of pendulum member 45. In attaining the FIG. 17 position, the curved beam and missile combination as supported by car assembly 34 may additionally rotate about pivot pins 38 and 39 and relative to portions of support assembly 14. In the FIG. 17 position the center of gravity of the apparatus-missile combination assumes a minimum position on the line defined by slot 47 of pendulum member 45. Resultant gravity or weight forces acting upon the missile and upon apparatus 10 are co-linear in a true vertical direction parallel to aligned slots 46 and 47. The edge of a true vertical plane containing the center of gravity of missile 60 is defined by the line established by slot 47 and may be scribed on reference card 57 in the manner shown in FIG. 18. The location of the center of gravity of missile 60 is in a vertical symmetry plane passing longitudinally through the missile and at a point on the normal projection of the intersection of lines scribed on reference card 57 in the operations of FIGS. 16 and 18.

The apparatus of this invention has been used to locate the center of gravity of missile devices having an overall length of approximately 17 feet and an approximate weight of 600 pounds to an accuracy within 1/16 inch of the absolute center of gravity. Departures from absolute center of gravity within the 1/16 inch limitation are sourced largely in the presence of minor frictional forces and tolerances associated with placing reference marks and scribing location lines.

The center of gravity information obtained using the apparatus of this invention and the methods defined in connection with FIGS. 13 through 18 may be employed to determine the proper location for a subsequently attached booster propulsion unit such as 64 shown in FIG. 19. Adjustments may be made for shifts in center of gravity location caused by subsequently added equipment, fuel, and propulsion units. Conventional analytical techniques utilizing the center of gravity information developed by use of apparatus 10 are used to select a proper location for booster unit 64 on mounting member 65 of missile 60. In the proper location, the centerline of booster unit propulsion forces may be made to pass through the center of gravity of the complete missile assembly. The reference card designated 57 is removed from the suspended object prior to flight.

I claim:

1. In apparatus for graphically locating a perpendicular projection of an object center of gravity as contained in a vertical plane: support means freely rotatable relative to an axis of rotation oriented perpendicular to the vertical plane, beam means carried by said support means and oriented so as to be translatable relative to said axis of rotation in a plane that is non-divergent to the vertical plane, means for attaching the object in a fixed position relative to said beam means, weight means carried by said beam means and movable relative thereto to provide said beam means and said weight means combination with alternate centers of gravity at referenced locations, and means defining a vertically-oriented straight edge positioned along a line which intersects said axis of rotation, said vertically-oriented edge means locating the perpendicular projection of the object center of gravity at the intersection of successive positions as said beam means is respectively successively positioned with said alternate centers of gravity at said vertically-oriented edge means.

2. In apparatus for graphically locating a perpendicular projection of an object center of gravity as contained in a vertical plane: support means which freely rotates relative to an axis of rotation oriented perpendicular to the vertical plane, curved beam means carried by said support means and oriented so as to be translatable relative to said axis of rotation in a plane that is nondivergent to the vertical plane, alternately positionable weight means carried by said beam means and movable to establish alternate marked centers of gravity in said beam means, connecting means for securing the object to said beam means, and pendulum means having upper and lower reference edges which are located along a straight line that intersects said support means axis of rotation, said pendulum means being freely rotatable relative to said support means about said axis of rotation, and said beam means alternate centers of gravity being successively positionable at said pendulum means upper reference edge to graphically locate the object center of gravity perpendicular projection at an intersection of the lines established by the respective successive positions of said pendulum means lower reference edges.

3. The apparatus defined by claim 2, wherein said curved beam means is provided with a support surface that contacts said support means, said curved beam means support surface having a center of curvature located approximately at the center of gravity of the subject when the object is secured to said curved beam means by said connecting means.

4. The apparatus defined by claim 3, wherein said support means includes roller components for contacting said curved beam means support surface, said roller components being secured to said support means at locations positioned to either side of said support means axis of rotation.

References Cited by the Examiner
UNITED STATES PATENTS

| | | | |
|---|---|---|---|
| 2,492,199 | 12/49 | Spaulding | 73—65 |
| 2,495,709 | 1/50 | Drown et al. | 73—65 X |
| 2,995,924 | 8/61 | Karpovich | 73—65 |
| 3,040,563 | 6/62 | Eckles et al. | 73—65 |

FOREIGN PATENTS 548,991   11/42   Great Britain.

RICHARD C. QUEISSER, *Primary Examiner.*

ROBERT L. EVANS, *Examiner.*